Jan. 23, 1951  J. R. McGUIRE  2,538,843
COMPOSITE AIRCRAFT FLIGHT INSTRUMENT
Filed June 3, 1946  3 Sheets-Sheet 1

INVENTOR
J. ROY McGUIRE
BY
Toulmin & Toulmin
ATTORNEYS

Jan. 23, 1951  J. R. McGUIRE  2,538,843
COMPOSITE AIRCRAFT FLIGHT INSTRUMENT
Filed June 3, 1946  3 Sheets-Sheet 2

INVENTOR
J. ROY McGUIRE
BY
Toulmin & Toulmin
ATTORNEYS

Jan. 23, 1951 J. R. McGUIRE 2,538,843
COMPOSITE AIRCRAFT FLIGHT INSTRUMENT
Filed June 3, 1946 3 Sheets-Sheet 3
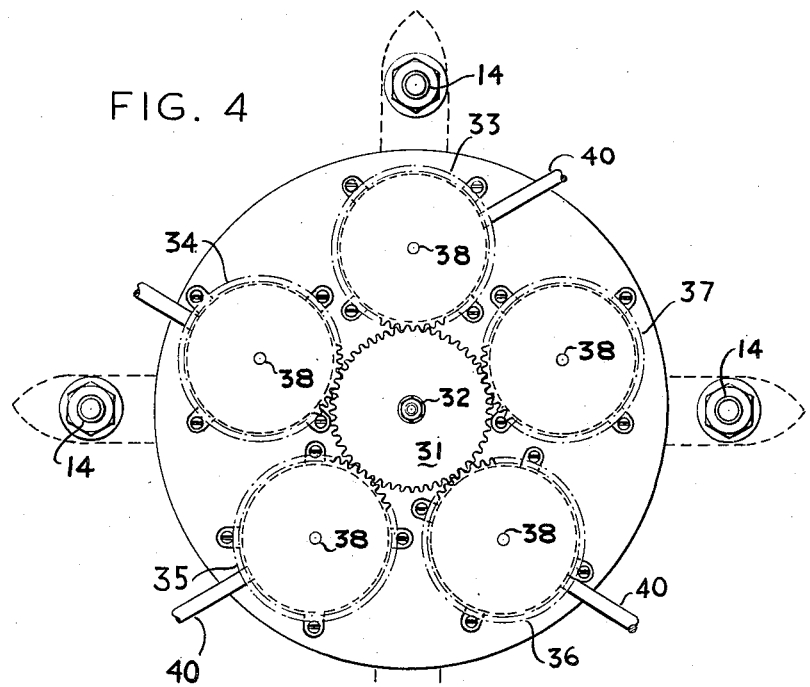
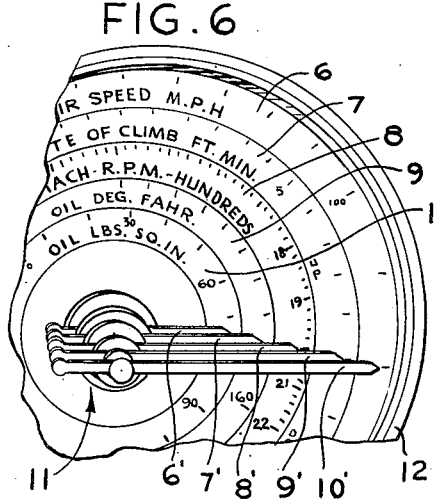
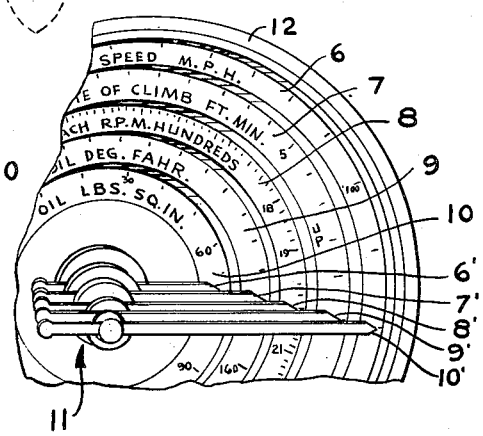
INVENTOR
J. ROY McGUIRE
BY
Toulmin & Toulmin
ATTORNEYS Patented Jan. 23, 1951

2,538,843

UNITED STATES PATENT OFFICE 2,538,843

COMPOSITE AIRCRAFT FLIGHT INSTRUMENT

J. Roy McGuire, Dayton, Ohio

Application June 3, 1946, Serial No. 674,113

3 Claims. (Cl. 73—178)

The present invention relates to aircraft instruments.

When an airplane is in flight, it becomes necessary for the pilot to observe many instruments distributed over a large panel. The readings have different nomenclature with different normal values, and the pilot then has to translate the variations of the readings from these values into changes of control of the aircraft and of the engine. These considerations may involve much mental effort and are particularly arduous when the pilot desires to relax, as for example, on a cruise under favorable weather conditions. It will be understood that when leisurely travelling from one point to another only a small proportion of the elapsed flying time is used in climbing to the proper altitude and in landing. Since most of the time is taken up in cruising at a constant altitude, still assuming favorable flying conditions, it is highly desirable that as much relaxation shall be accorded to the pilot as possible during the cruising portion of the travel.

However, due to the manner in which the flying instruments are arranged on the panel, all recording different data, the pilot still must remain alert and constantly on the watch for any variation of the reading in any instrument from the normal value which might indicate the start of an emergency flying condition which must be attended to immediately.

The main object of the invention is to provide a simplified form of aircraft instrument which will relieve the pilot of much of the mental effort that was heretofore necessary in evaluating the readings and particularly useful on air cruises when the maximum relaxation on the part of the pilot is highly desirable.

Another object is to provide an improved instrument which will accommodate all of the usual readings and their normal values together with a pointer arrangement by which variations in the operation of the plane and engine can be immediately detected in order that correctives can be applied.

These objects are attained in brief by combining the readings of all of the standard flying instruments within a single casing, together with independently operated pointers, the various dials being pre-set to a position such that when the plane and engine are operating under normal conditions the pointers will line up with one another. The invention will be better understood when reference is made to the following description and the accompanying drawings, in which:

Figure 4 illustrates the rear view of the instrument to show the relation of the gear mechanism with respect to the centrally disposed pointer shafts.

Figure 5 is a fragmentary perspective view of the instrument shown in Figure 3; while Figure 6 also is a fragmentary view but showing a modified form of instrument particularly with respect to the positions of the various dials.

Figure 1:
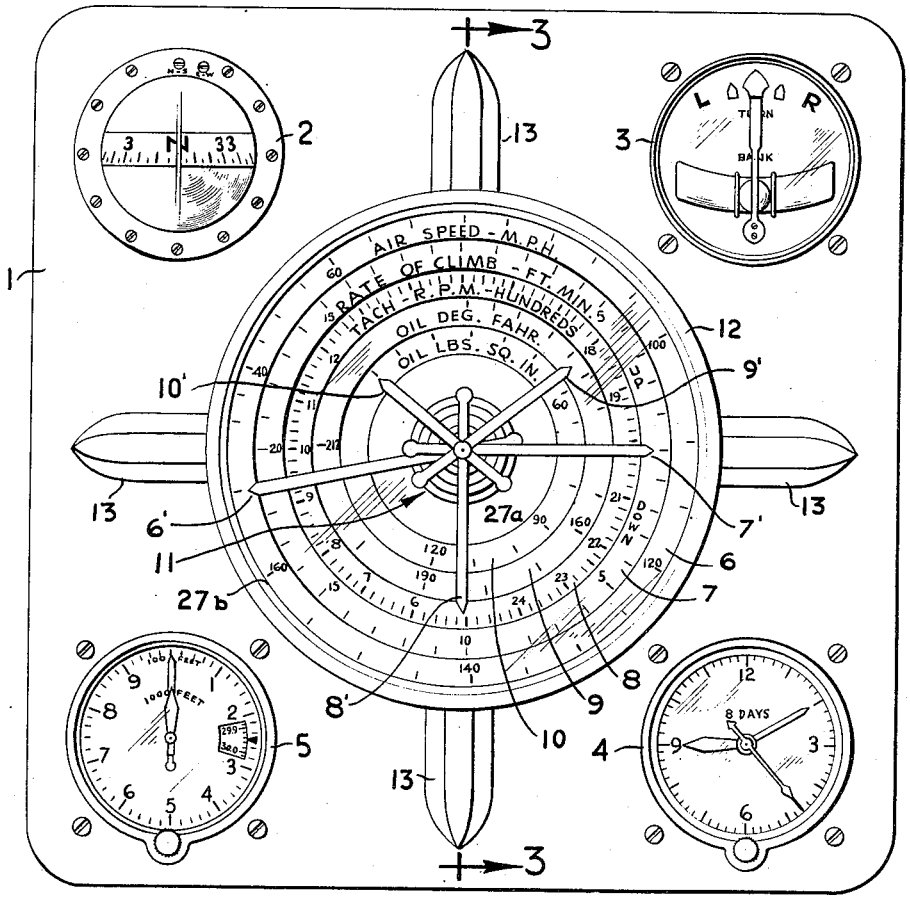
Figure 1 represents a plan view of the improved instrument secured to the usual panel.

Referring to Figure 1 reference character 1 designates a panel of the usual type. At each of the corners of the panel various instruments are shown: at the upper left hand corner, a compass 2; at the upper right hand corner, a Ball bank indicator 3; at the lower right hand corner, an eight-day clock 4 and at the lower left hand corner, an altimeter 5. These instruments are of any suitable and well-known type.

In addition to the four instruments enumerated, the usual pilot's panel includes devices for indicating the Fahrenheit temperature of the oil, the pressure of the oil in pounds per square inch, the speed of the engine in hundreds of R. P. M., the rate of climb in hundreds of feet per minute and also the air speed in miles per hour. These devices are usually distributed over the panel which necessitates a panel of large dimensions. In order for the pilot to determine as to whether the plane and the engine are operating at optimum conditions, it is necessary for the pilot to scan each instrument and more especially to determine whether the readings shown deviate too greatly from a normal reading which is usually determined by the airplane designer or manufacturer. Each variation from the normal value must be translated by the pilot into changes of aerodynamic or engine control in order that the normal reading of a given instrument shall be attained. This may represent considerable effort as the relative effects of these variations from the normal values must be judged quickly and accurately because some of the abnormal conditions should be altered ahead of the others. The present invention is directed to an improved form of instrument panel by which the readings of a large number of the instruments are reduced to their minimum terms and can be readily evaluated by the pilot. Thus, greater periods of relaxation and leisure are accorded to the pilot particularly on cruising trips as when the flight is usually at a relatively constant attitude and the rate of climb is zero for long distances.

Figure 2:
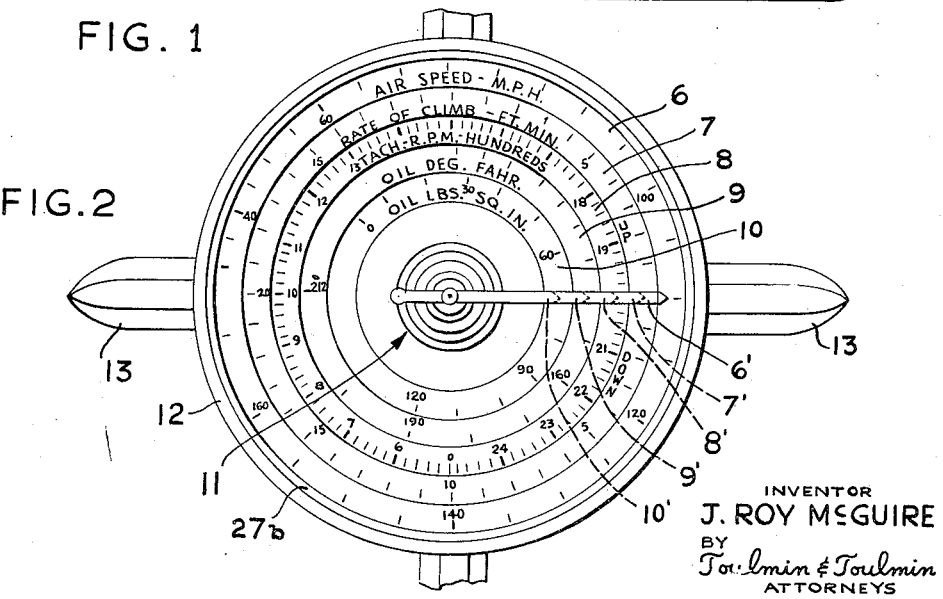
Figure 2 is a view of the improved instrument without the panel and showing the position the pointers take under normal operating conditions.
Figure 3:
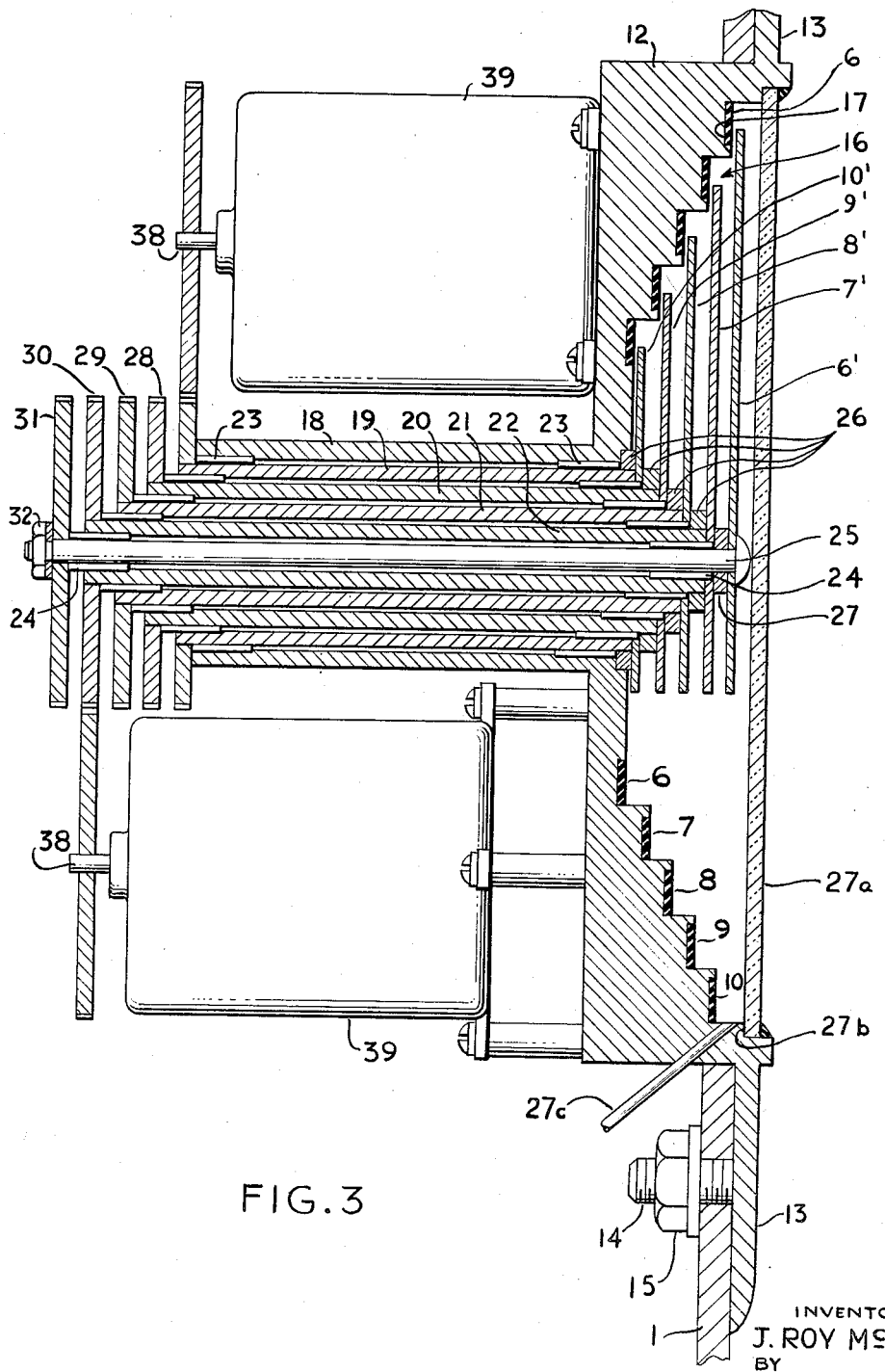
Figure 3 is a cross-sectional view on line 3—3 in Figure 1, greatly enlarged, taken through the instrument but showing the actuators for the pointers in elevation.

In accordance with my invention five of the usual instruments are combined within a single casing and the dials are so arranged with respect to one another that when normal operating conditions have been attained, all of the pointers will line up with one another, preferably extending to the right and in the horizontal direction. As shown in Figures 1 and 2, the dials are arranged concentrically, one within the other, in the following order: air speed, rate of climb, tachometer-R. P. M., oil temperature gauge and oil pressure gauge. These dials are designated for convenience respectively by reference characters 6, 7, 8, 9 and 10. The pointers for these individual dials are represented by the reference characters 6', 7', 8', 9' and 10'. Each of the pointers are individually mounted at the center of the casing as indicated generally by reference character 11 and may be provided with the usual torsional bias spring. The casing 12 may constitute a relatively thick circular plate (Fig. 3) having outwardly extending projections 13 for mounting on the panel. If desired, bolts 14 may be secured to the projections 13, these bolts passing through suitably positioned openings in the panel 1 and secured by nuts 15. The plate 12 may be provided with a series of stepped recesses, indicated generally at 16 (Fig. 3) and at each stepped position there is a circular groove 17 for receiving an annularly shaped plate which together constitute the dials 6, 7, 8, 9 and 10. The main plate 12 is provided with a longitudinally extending sleeve 18 and within this sleeve there is positioned a plurality of independently rotatable sleeves 19, 20, 21 and 22 which are mounted with small clearance from one another and preferably supported at each end on hardened needle bearings 23. Within the sleeve 22 there is also mounted as by the needle bearings 24 a centrally disposed shaft 25. The pointers 6' to 10' are secured in any suitable manner such as by welding to one end of the shaft 25 and the sleeves 19 to 22 as indicated.

If desired, rings 26 may be affixed to the sleeves 19 to 22 to hold the needle bearings in place and a washer 27 may be applied to the shaft 25 for the same purpose. A glass window 27a extends across the opening in the plate 12 and supported, if desired, on shoulders, indicated at 27b. The plate may be hermetically sealed against the shoulder. It is apparent that the rings 26 and the washer 27 together with the window 27a provide a hermetically sealed enclosure and, if desired, a static tube 27c may be brought in communication with this interior space.

At their ends opposite from the pointers, the sleeves 19 to 22 and the shaft 25 carry gears 28, 29, 30 and 31 respectively. The gears 28 to 30 may be welded or secured in any suitable manner to their respective sleeves while the gear 31 is preferably bolted to the shaft 25, as indicated at 32. These gears are all centrally mounted with respect to the plate 12 and are, therefore, positioned at different levels. As shown in Figure 4, each of these gears mesh respectively with gears 33 to 37, inclusive, which gears are preferably arranged symmetrically around the central gear group. The gears 33 to 37 are carried on individual shafts typified by two such shafts 38 which extend into the actuators, also typified by a pair of such devices in Figure 3. These actuators constitute a standard structure by which air speed, rate of climb, tachometer-R. P. M., oil temperature and oil pressure are usually determined in standard instruments.

In other words, I employ all of the operating mechanism of such instruments but without the dials of pointers and movable elements of such instrument are represented by the typical shafts 38. The casings 39 of the actuators are preferably hermetically sealed in the usual manner and a static line 40 may be taken to any of the casings as desired.

The instrument designer when adjusting the various dials 6 to 10, inclusive, or the manufacturer of the aircraft, assuming that the instrument is provided at the time the airplane is manufactured, sets the dials from the operating specifications of the given plane so that when the pointers 6' to 10', inclusive, are in alignment, preferably extending to the right as shown in Fig. 2, they will indicate optimum operating conditions on each of the dials. In case these conditions are intended to apply to cruising operation during which the rate of climb is zero, the dial 7 is set so that the zero is in the horizontal position and the air speed dial is set to indicate at the same position the most economical and safe speed for the plane. Having set the air speed dial, this would automatically determine the tachometer indication at the horizontal position and from the engine specifications the proper oil temperature and oil pressure can be readily ascertained. In order to facilitate the positioning of the various dials, the dial plates are preferably snugly but slidably mounted within their grooves 17 and this will permit any adjustments that may be found necessary over a period of time.

As shown in Figs. 1 and 2, the designations on the air speed dial and the tachometer increase in the clockwise direction while the rate of climb increases in the opposite or counter-clockwise direction. Consequently when the nose of the plane rises, and assuming that the plane is operating in a normal manner, the needles 6', 7' and 8' all rise from the horizontal position (shown in Fig. 2) and these needles would maintain some semblance of alignment, or at least would rise in consonance with one another. If either one of the needles 6' or 8' were to move downwardly, i. e. clockwise, when the plane was in a climb as shown by a counter-clockwise movement of the needle 7', the pilot would know at a glance that something had gone wrong with the operation, such as that the rate of climb may have been too steep for the plane or the engine. Moreover, even if all three pointers 6', 7' and 8' were to move in the same direction, i. e. counter-clockwise, as a result of raising the nose of the plane, and assuming that for some reason or other there was a great disparity between the aligned positions of these indicators as they swing upwardly, this again would indicate to the pilot that he may have been exceeding any one of the several flight parameters of the plane. It is apparent that this proportionality between the readings of the respective dials extends throughout their entire peripheral lengths, because each dial has a complete set of indications, i. e. there are no blank spots and such indications obviously represent calibrated values assigned by the manufacturer. However, it is to be understood that when the air speed, tachometer, the temperature of the oil and the pressure of the oil dials are provided by the manufacturer on their respective instruments, the indications on the dials of those instruments normally increase counter-clockwise. But in carrying out the objects of my invention, I assemble on the panel the manufacturer's actuators in the reverse direction from that intended by the manufacturer with a correspondingly reverse showing of the dials in order that all three needles 6', 7' and 8' which follow the aerodynamic operation of the plane shall move in the same direction rather than in opposite directions when the plane is operating normally.

It is apparent that inasmuch as the various dials have been so arranged that the optimum or normal operating conditions are shown on these dials are represented by indications in line with one another, the line pointers will immediately convey to the pilot the information that the engine values indicated by the pointers are correct for optimum flying conditions. The pilot is, therefore, relieved of mentally considering the optimum or normal values as applied to each of the various dials and to that extent he can fly with more relaxation than was possible if he were required to observe a large number of instruments scattered over a panel board. In order still further to facilitate the indications of the aligned pointers, the latter may, if desired, be painted different colors so as to show as quickly as possible whether or not any one of the pointers is out of alignment.

Instead of applying the dial plates to a shouldered construction within the large circular plate 12 (Fig. 3) I may arrange these dial plates in the same plane so as not to necessitate the shouldered recess. Structure of this character is illustrated in Figure 6 in which it will be noted that the dials are still arranged concentrically with respect to one another. This particular construction has some advantage over the stepped construction in that the dial plates in Figure 6 provide their own grooves as one annular plate can readily slide past the other plate, still keeping the planar relation.

From the foregoing, it is apparent that I have disclosed a novel form of instrument for facilitating the instrument reading and particularly for readily determining the normal or cruising values of various instruments which usually represent uncorrelated determinations. Due to the manner in which the various pointers automatically line up when optimum flying conditions are reached, the improved instrument is of especial benefit during blind flying.

While I have illustrated the instrument as applying to only five of the usual forms of readings, it is apparent that other instrument dials may be inserted or substituted for those illustrated. However, the dials which have been shown, together with the four primary instruments 2, 3, 4 and 5 represent practically all of the instruments that are found most essential in simplified panel boards. Instead of using an instrument of circular configuration, a casing of any other form or shape could be employed, for example, rectangular, with the dials extending parallel to one another and the pointers in alignment at the normal or optimum value on each of the dials.

It will be understood that various modifications and arrangements in structure could be made without departing from the spirit of my invention and, accordingly, I desire to comprehend such modifications and substitutions of equivalents as may be considered to come within the scope of the appended claims.

Having thus fully described my invention, what I claim as new and desire to secure by Letters-Patent is:

1. An airplane instrument comprising a casing having a plate, a plurality of co-axially arranged dials mounted for rotation in said instrument, a plurality of actuators corresponding to said dials and angularly spaced apart about the axis of said dials, said actuators being positioned substantially the same distance from said plate, and a pointer for each of said dials coupled to its corresponding actuator, said actuators being adapted to be operated by the air control and power elements of the airplane.

2. An airplane instrument comprising a casing containing a plurality of co-axially arranged dials mounted for rotation in said casing, said dials including the rate of climb, the air speed and tachometer readings, pointers for the dials, and actuators for operating said pointers in accordance with the aerodynamic and engine control of the airplane, said actuators being angularly spaced apart around the axis of said dials and mechanically coupled to their respective pointers, said dials having indications thereon to represent the aerodynamic and engine operating values, said dials being rotated to such positions that the indications thereon call for pointer positions in horizontal alignment when the plane is traveling under optimum aerodynamic and engine conditions, and the pointers for the rate of climb, the air speed and tachometer readings move upwardly away from said horizontal position when the nose of the plane rises.

3. An airplane instrument comprising a casing having a plate, a plurality of co-axially arranged dials mounted for rotation in said casing, actuators for said dials angularly spaced apart about the axis of the dials, said actuators being positioned at substantially the same distance from said plate, and a pointer for each of said dials coupled to its corresponding actuator, said actuators being adapted to be operated by the air control and power elements of the airplane, said pointers which travel over the dials being visible over their entire lengths except when positioned in line with one another.

J. ROY McGUIRE.

REFERENCES CITED

The following references are of record in the file of this patent:

UNITED STATES PATENTS

| Number | Name | Date |
|---|---|---|
| 398,713 | Enos | Feb. 26, 1889 |
| 1,850,640 | Sperry et al. | Mar. 22, 1932 |
| 1,960,241 | Deerwester | May 29, 1934 |
| 2,112,704 | Mackay | Mar. 29, 1938 |
| 2,202,987 | Egeuas | June 4, 1940 |
| 2,296,032 | Hammond | Sept. 15, 1942 |

FOREIGN PATENTS

| Number | Country | Date |
|---|---|---|
| 416,766 | Great Britain | Sept. 20, 1934 |